United States Patent
Kleshchev et al.

(10) Patent No.: US 10,309,434 B2
(45) Date of Patent: Jun. 4, 2019

(54) THRUST REVERSER HONEYCOMB PANEL LOAD DISTRIBUTION SYSTEMS AND METHODS

(71) Applicant: The Boeing Company, Chicago, IL (US)

(72) Inventors: Fedor Kleshchev, Seattle, WA (US); Kyle Thomas, Bellevue, WA (US); Billy P. Tung, Seattle, WA (US); Michael Maffeo, Seattle, WA (US); Robert Shaun Farrell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 356 days.

(21) Appl. No.: 15/087,531

(22) Filed: Mar. 31, 2016

(65) Prior Publication Data
US 2017/0284338 A1   Oct. 5, 2017

(51) Int. Cl.
| | |
|---|---|
| *F16B 5/01* | (2006.01) |
| *F01D 25/24* | (2006.01) |
| *F02K 1/54* | (2006.01) |
| *F16B 5/02* | (2006.01) |
| *F02C 7/20* | (2006.01) |
| *B64D 27/12* | (2006.01) |
| *B64D 29/06* | (2006.01) |
| *F02K 1/60* | (2006.01) |
| *F02K 1/76* | (2006.01) |

(52) U.S. Cl.
CPC ............... *F16B 5/01* (2013.01); *B64D 27/12* (2013.01); *B64D 29/06* (2013.01); *F01D 25/243* (2013.01); *F02C 7/20* (2013.01); *F02K 1/54* (2013.01); *F02K 1/605* (2013.01); *F02K 1/766* (2013.01); *F16B 5/02* (2013.01); *F05D 2220/323* (2013.01); *F05D 2230/60* (2013.01); *F05D 2250/283* (2013.01); *F05D 2260/30* (2013.01); *F05D 2260/31* (2013.01); *Y02T 50/672* (2013.01)

(58) Field of Classification Search
CPC ............ B64D 27/12; B64D 29/06; F16B 5/01
See application file for complete search history.

(56) References Cited

U.S. PATENT DOCUMENTS

| | | | |
|---|---|---|---|
| 277,735 A * | 5/1883 | Waddill | F16B 5/01 411/82.1 |
| 2,957,196 A | 10/1960 | Kreider et al. | |
| 3,137,887 A * | 6/1964 | Mannino | F16B 5/01 16/2.1 |
| 3,451,181 A | 6/1969 | Neuschotz | |
| 4,471,013 A | 9/1984 | Welzen | |

(Continued)

FOREIGN PATENT DOCUMENTS

| | | |
|---|---|---|
| EP | 1 024 301 A2 | 8/2000 |
| EP | 2 594 809 A1 | 5/2013 |

*Primary Examiner* — Magdalena Topolski
(74) *Attorney, Agent, or Firm* — Haynes and Boone, LLP

(57) ABSTRACT

Provided is an aircraft propulsor thrust reverser with a fastening system. The fastening system may include a male spool and a female spool configured to be threaded into the male spool. The male spool and the female spool may be coupled to a honeycomb structure and may evenly distribute force to the honeycomb structure to prevent plastic deformation of a honeycomb core of the honeycomb structure.

20 Claims, 6 Drawing Sheets

(56) References Cited

U.S. PATENT DOCUMENTS

| | | | |
|---|---|---|---|
| 4,490,083 A * | 12/1984 | Rebish | F16B 5/02 |
| | | | 411/338 |
| 4,557,100 A | 12/1985 | Gorges | |
| 4,717,612 A | 1/1988 | Shackelford | |
| 4,761,860 A * | 8/1988 | Krauss | A43C 5/00 |
| | | | 24/713.6 |
| 4,934,861 A * | 6/1990 | Weeks | B62D 21/09 |
| | | | 403/167 |
| 4,981,735 A | 1/1991 | Rickson | |
| 5,069,586 A * | 12/1991 | Casey | A44B 13/007 |
| | | | 16/2.1 |
| 5,093,957 A * | 3/1992 | Do | E04C 2/365 |
| | | | 16/2.1 |
| 5,542,777 A | 8/1996 | Johnson | |
| 6,051,302 A | 4/2000 | Moore | |
| 6,264,412 B1 | 7/2001 | Nakamura et al. | |
| 6,488,460 B1 | 12/2002 | Smith et al. | |

\* cited by examiner

THRUST REVERSER HONEYCOMB PANEL LOAD DISTRIBUTION SYSTEMS AND METHODS

TECHNICAL FIELD

The disclosure relates generally to aircraft and more specifically to aircraft thrust reversers and to distribution of loads through honeycomb panels.

BACKGROUND

Aircraft propulsor thrust reversers often include an inner wall and an outer wall. The inner wall may be located close to the core engine of the aircraft propulsor. As core engines of aircraft propulsors increase in power, the amount of heat generated by the engines also typically increases. The inner wall, located close to the core engine, may also experience higher temperature levels. The inner walls may be attached to other structures of the aircraft. However, traditional techniques of creating coupling features for attaching of the inner walls to the other structures of the aircraft may be ineffective due to the high temperatures.

SUMMARY

Systems and methods are disclosed herein for thrust reverser honeycomb panel load distribution. In certain examples an aircraft propulsor may be provided. The aircraft propulsor may include a core engine and a thrust reverser. The thrust reverser may include an inner wall located proximate the core engine. The inner wall may include a honeycomb structure including a first facesheet, a second facesheet, a honeycomb core disposed between the first facesheet and the second facesheet, and an aperture, and a fastening system disposed within the aperture. The fastening system may include a male spool and a female spool. The male spool may include a male spool body, where an external threaded portion is disposed on at least a first end of the male spool body, a male through hole is disposed within the male spool body, and a male flange portion is disposed on a second end of the male spool body, is coupled to the first facesheet, and is configured to distribute load to the honeycomb structure. The female spool may include a female spool body, where a internal threaded portion is disposed on at least a first end of the female spool body and coupled to the external threaded portion to fasten the male spool and the female spool to the honeycomb structure, a female through hole is disposed within the female spool body, and a female flange is portion disposed on a second end of the female spool body, is coupled to the second facesheet, and is configured to distribute load to the honeycomb structure.

In certain other embodiments, a fastening system for a structure may be provided. The fastening system may include a male spool and a female spool. The male spool may include a male spool body where an external threaded portion is disposed on at least a first end of the male spool body, a male through hole is disposed within the male spool body, and a male flange portion is disposed on a second end of the male spool body and is configured to couple to a first facesheet of a honeycomb structure and distribute load to the honeycomb structure when the male flange portion is coupled to the first facesheet. The female spool may include a female spool body where an internal threaded portion is disposed on at least a first end of the female spool body and is configured to couple to the external threaded portion to fasten the male spool and the female spool to the honeycomb structure, a female through hole is disposed within the female spool body, and a female flange portion is disposed on a second end of the female spool body and is configured to couple to a second facesheet of the honeycomb structure and distribute load to the honeycomb structure when the female flange portion is coupled to the second facesheet.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Systems and techniques for a fastening system for distribution of point loads through honeycomb panels are described in the disclosure herein in accordance with one or more examples. In certain examples, the honeycomb panels may be panels of an aircraft propulsor. The honeycomb panels may be, for example, a portion of a thrust reverser of the aircraft propulsor. In such an example, the honeycomb panels may be an outer wall, an inner wall, or another portion of the thrust reverser.

The fastening system may include a male spool and a female spool. The male spool may include a male spool body that may include an external threaded portion disposed on a cylindrical or substantially cylindrical portion of the male spool body and a male flange portion. The female spool may include a female spool body that may include an internal threaded portion disposed on a cylindrical or substantially cylindrical portion of the female spool body and a female flange portion. The male spool may be inserted into an aperture of the honeycomb panel from one end, while the female spool may be inserted into the aperture from the other end. The male spool and the female spool may be coupled to each other by, for example, being threaded onto each other. The male flange portion may contact a first facesheet of the honeycomb structure while the female flange portion may contact a second facesheet of the honeycomb structure opposite that of the first facesheet. The male spool and the female spool may be threaded to a specified torque value.

Force imparted by the fastening of the male spool to the female spool and/or from fasteners tightened to the male spool and/or the female spool may be transferred to the honeycomb structure.

Figure 1:
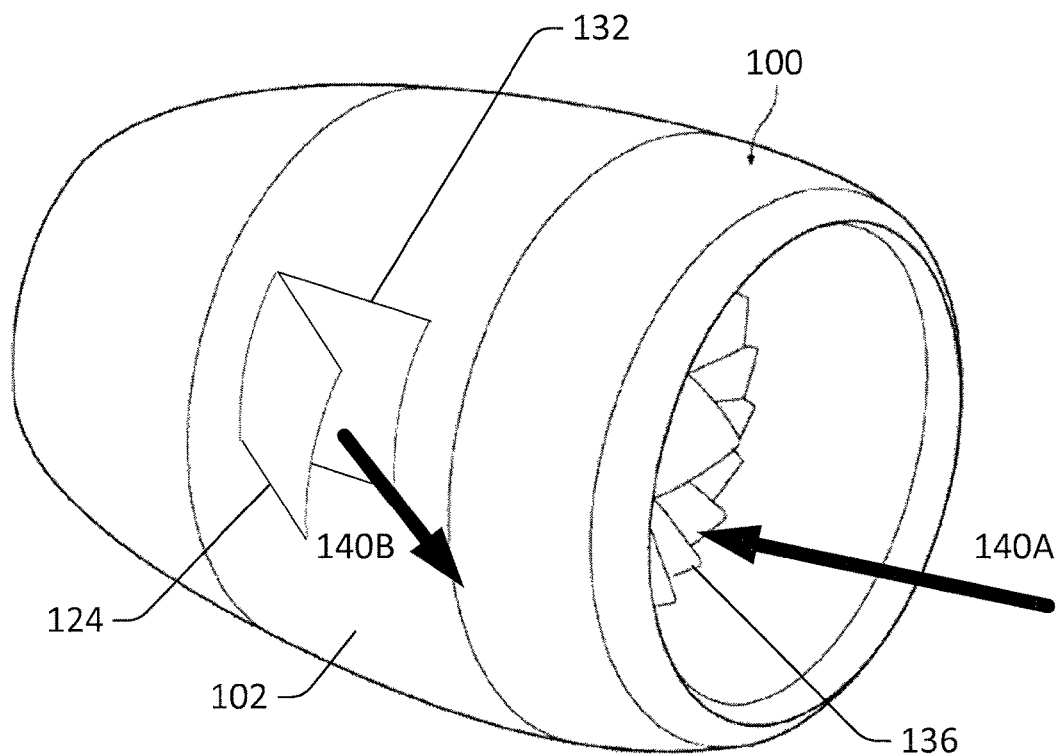
FIG. 1 illustrates a perspective view of an aircraft propulsor in accordance with an example of the disclosure.

FIG. 1 illustrates a perspective view of an aircraft propulsor in accordance with an example of the disclosure. Aircraft propulsor 100 may include a nacelle 102, a thrust reverser door 124, and a fan 136. In the example shown in FIG. 1, the nacelle 102 may contain the fan 136, but other examples of the aircraft propulsor may arrange the fan so that the fan is not contained by the nacelle (e.g., in, for example, a turboprop configuration). The fan 136 may intake and/or energize air flowing into the nacelle 102, such as in an airflow direction 140A. Air that flows into the nacelle 102 via airflow direction 140A may flow through various internal flow paths within the nacelle 102. When the aircraft propulsor 100 is in a thrust reversing configuration, air that flows into the nacelle 102 in airflow direction 140A may be redirected to another direction to provide reverse thrust.

When the aircraft propulsor 100 is normally operating (e.g., providing thrust), the thrust reverser door 124 may be in a closed position that blocks the thrust reverser aperture (shown in FIG. 2 as thrust reverser aperture 132), sealing or substantially sealing the thrust reverser aperture so that there is no or minimal airflow through the thrust reverser aperture 132. When the aircraft propulsor 100 is in a thrust reversing configuration (e.g., providing reverse thrust to, for example, slow the aircraft 50 that the aircraft propulsor 100 may attached to), the thrust reverser door 124 may be in an open position that does not block the thrust reverser aperture 132, allowing for air to flow through the thrust reverser aperture 132. In certain examples, the thrust reverser door 124 may form the thrust reverser aperture 132 when the thrust reverser door 124 is in the open configuration. In such an example, there may be no thrust reverser aperture 132 when the thrust reverser door 124 is in a closed configuration.

Figure 2:
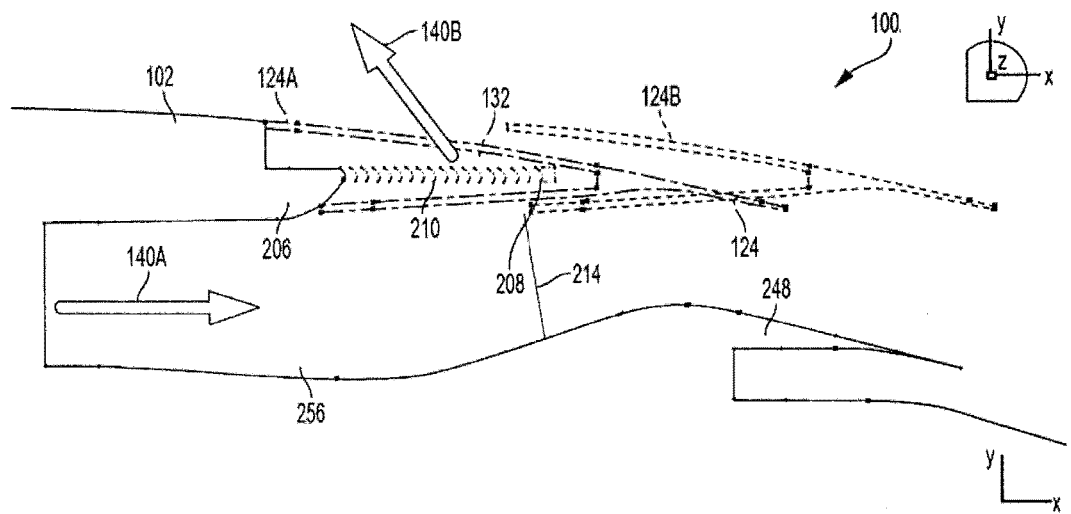
FIG. 2 illustrates a side cutaway view of an aircraft propulsor in accordance with an example of the disclosure.

FIG. 2 illustrates a side cutaway view of an aircraft propulsor in accordance with an example of the disclosure. The aircraft propulsor 100 shown in FIG. 2 may include the nacelle 102 with a bullnose 206, the thrust reverser door 124, a core engine 248, a thrust reverser cascade 210, a cascade support ring 208, a thrust reverser aperture 132, and a blocker door 214. The core engine 248 and/or the nacelle 102 may define, at least in part, a bypass flow path 256. Air energized by the fan 136 may flow through the bypass flow path 256. During normal operations, the energized air may flow out of an exhaust of the nacelle 102, but during thrust reversing, the energized air may be diverted by the blocker door 213 and flow out of nacelle 102 through the thrust reverser cascade and the thrust reverser aperture 132.

The nacelle 102 may be similar to the nacelle described in FIG. 1. The nacelle 102 in FIG. 2 may additionally include the bullnose 206. The bullnose 206 may be any structure that may couple to an end of the thrust reverser cascade 210. In certain examples, the bullnose 206 may extend from another portion of the nacelle 102 and may form a ledge of the nacelle 102. As shown in FIG. 2, at least the portion of the bullnose 206 facing the core engine 208 may include a smoothly radius'd surface. Such a radius'd surface may allow for smooth airflow from the bypass flow path 256 through the thrust reverser cascade 210 and, accordingly, allow for higher massflow through the thrust reverser cascade 210. A surface of the thrust reverser door 124 may be configured to be placed adjacent to or coupled to a portion of the bullnose 206 when in the closed position. As such, the thrust reverser door 124 may, when in the closed position, form a smooth or substantially smooth surface with an interior surface of the nacelle 102 to allow for smooth airflow within the aircraft propulsor 100 when the thrust reverser door 124 is in the closed position. In certain examples, the thrust reverser door 124 may include an inner wall and an outer wall.

FIG. 2 further illustrates the open and closed positions of the thrust reverser door 124. As shown, the thrust reverser door 124 may be in an open position 124B as well as a closed position 124A. The thrust reverser door 124 in other examples may be configured to be in other positions. Additionally, other examples may include non-translating thrust reverser doors (e.g., thrust reverser doors that may rotate between an open and a closed position, as well as other positions) as well as thrust reverser doors that open and close in other manners (e.g., through shutters, through the deployment of air deflectors, or through other manners).

In the closed position 124A, the thrust reverser door 124 may allow air to flow through the bypass flow path 256 of the aircraft propulsor 100 and exit the bypass flow path 256 through an exhaust to provide thrust. The bypass flow path 256 may be defined, at least in part, by portions of the core engine 248 and/or the nacelle 102. The air flowing through the bypass flowpath 256 may be energized by the fan 136, may generally flow in airflow direction 140A, and may provide thrust (or reverse thrust) to power the aircraft that the aircraft propulsor 100 is attached to. The core engine 248 may power the fan 136 and the fan 136 may energize the air flowing through the bypass flowpath 256.

When the thrust reverser door 124 is in the closed position 124A, the blocker door 214 may be positioned to not block or minimally block (e.g., be a restriction of less than 5% of total airflow within the bypass flow path 256) airflow within the bypass flow path 256.

In the open position 124B, the thrust reverser door 124 may allow air to flow through the thrust reverser aperture 132. In certain examples, when the thrust reverser door 124 is in the open position 124B, the blocker door 214 may also be moved into a position to block at least a portion of the bypass flow path 256 to divert airflow within the bypass flow path 256 through the thrust reverser aperture 132. Such diverted airflow may at least in part flow in airflow direction 140B or in the general direction of airflow direction 140B. Air flowing in airflow direction 140B may provide reverse thrust.

Diverted airflow may flow through the thrust reverser cascade 210. The linear thrust reverser cascade 210 shown in FIG. 2 may be a linear thrust reverser cascade. Though FIG. 2 shows a side cutaway view of the thrust reverser cascade 210, the thrust reverser cascade 210 may be circumferentially disposed and/or offset from, for example, the core engine 248 or another portion of the aircraft propulsor 100. E.g., the thrust reverser cascade 210 may "wrap around" the core engine 248. Additionally, the thrust reverser cascade 210 may extend linearly, or substantially linearly, from the bullnose 206 to the cascade support ring 208. The bullnose 206 and/or the cascade support ring 208 may be coupled to the thrust reverser cascade 210. The bullnose 206 and/or the cascade support ring 208 may support and/or hold in place the thrust reverser cascade 210. In certain such examples, the cascade support ring 208 may be attached to other structural features of the aircraft propulsor 100.

Figure 3:
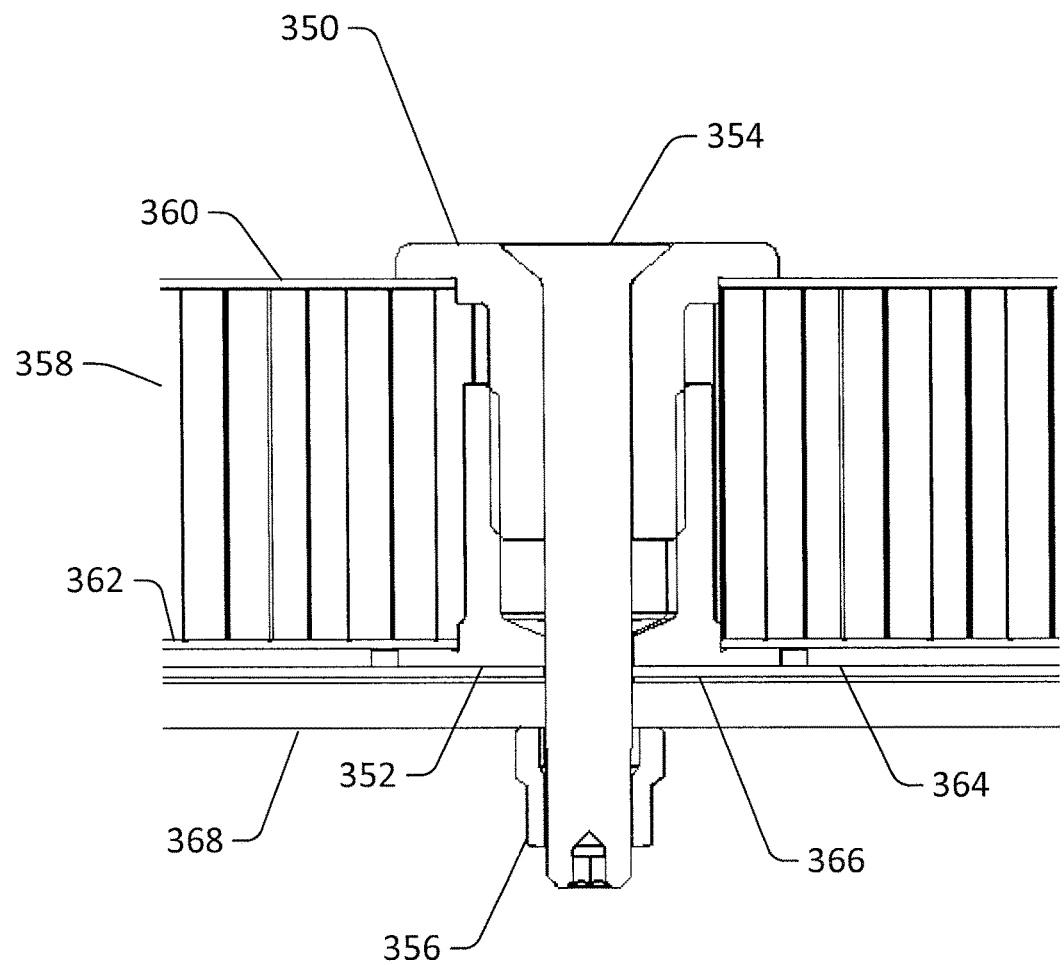
FIG. 3 illustrates a side cutaway view of a honeycomb structure and a honeycomb fastening system in accordance with an example of the disclosure.

FIG. 3 illustrates a side cutaway view of a honeycomb structure and a honeycomb fastening system in accordance with an example of the disclosure. FIG. 3 includes a honeycomb structure with a first facesheet 360, a second facesheet 362, and a honeycomb core 358, a honeycomb fastening system with a male spool 350, a female spool 352, a bolt 354, and a nut 356. Additionally, various examples of FIG. 3 may also include a shim 366, a secondary structure 368, and a spacer plate 364.

The honeycomb structure includes the first facesheet 360, the second facesheet 362, and the honeycomb core 358. The honeycomb core 358 is disposed between the first facesheet 360 and the second facesheet 362. In certain other examples, additional items may be disposed between the first facesheet 360, the honeycomb core 358, and/or the second facesheet 362. In certain examples, the first facesheet 360, the second facesheet 362, and/or the honeycomb core 358 may all be constructed from the same material, but other examples may construct the first facesheet 360, the second facesheet 362, and/or the honeycomb core 358 from a plurality of different materials. Such materials may be, for example, a metal such as steel, aluminum, titanium, tungsten, copper, and other metals, a composite such as fiberglass, carbon fiber, Kevlar, and other composites, a plastic, wood, glass, and other suitable types of material. For example, in certain examples, the first facesheet 360, the honeycomb core 358, and the second facesheet 362 may all be constructed from, at least, titanium. In certain other examples, the first facesheet 360 and the second facesheet 362 may be constructed from a combination of carbon fiber and Kevlar, but the honeycomb core 358 may be constructed from only carbon fiber. In certain such examples, the coefficient of thermal expansion of the honeycomb structure and the male spool and/or the female spool may be substantially similar (e.g., within 20% or less). Accordingly, the honeycomb structure may be comprised of the same material as that of the male spool and/or the female spool (e.g., all are made from titanium) or may be comprised of materials that have substantially similar coefficients of thermal expansion.

The male spool 350 includes a male spool body. At least a portion of the male spool body may be cylindrical or substantially cylindrical. The male spool body includes an external threaded portion disposed on a cylindrical or substantially cylindrical portion of the male spool body. Additionally, the male spool body includes a male flange portion. The male flange portion is configured to, when coupled to the honeycomb structure, transfer force to the first facesheet 360 of the honeycomb structure. The male spool 350 may be further described in FIG. 4.

The female spool 352 includes a female spool body. At least a portion of the female spool body may be cylindrical or substantially cylindrical. The female spool body includes an external threaded portion disposed on a cylindrical or substantially cylindrical portion of the female spool body. Additionally, the female spool body includes a female flange portion. The female flange portion is configured to, when coupled to the honeycomb structure, transfer force to the second facesheet 362 of the honeycomb structure. The female spool 352 may be further described in FIG. 5.

The male spool 350 and the female spool 352 may be coupled by threading together the external and internal threaded portions. In certain embodiments, the male spool 350 and the female spool 352 may be coupled without, for example, welding, potting, or crushing of the honeycomb core 358. As such, fastening of the male spool 350 and the female spool 352 may be accomplished repeatably at a high rate of production with a minimum of inspection. The fastening may not damage the honeycomb structure (e.g., may not crush and/or plastically deform the honeycomb core 358). Additionally, the fastening of the male spool 350 and the female spool 352 may allow the fastening system to withstand higher temperatures such as 300 degrees Celsius or less, 500 degrees Celsius or less, 1,000 degrees Celsius or less, or more than 1,000 degrees Celsius. As such, the fastening system may not include potting compounds or other adhesives that may melt or weaken at such high temperatures. The lack of such adhesives may allow the fastening system to withstand higher temperatures.

The ability to withstand higher temperatures may be beneficial in certain applications. For example, the thrust reverser door 124 may include a portion, such as the inner wall, that may be located close or face the core engine 248. Such portions may be exposed to high temperatures and, accordingly, the fastening system disclosed herein may withstand such higher temperatures.

The spools may be threaded together to a specified torque value. Force from threading together the spools and/or from any fasteners installed using the spools (e.g., the bolt 354) may be transferred, via the male flange portion and/or the female flange portion, to the honeycomb structure. As such, the male flange portion of the male spool 350 may transfer force received by the male spool 350 to the first facesheet 360 and the female flange portion of the female spool 352 may transfer force received by the female spool 352 to the second facesheet 362. In examples where the bolt 354 and the nut 356 are fastened to the spools, load may thus be transferred from the bolt 354 through the spool walls and into the first facesheet 360 and/or the second facesheet 362. The male flange portion and/or the female flange portion may be sized such that the load may be transferred over a sufficiently large area of the first facesheet 360 and/or the second facesheet 362 to prevent deformation and/or plastic deformation of the honeycomb core 358.

Certain examples may also include the shim 366. The shim 366 may, for example, cover one of the male spool 350 and/or the female spool 352. In the example illustrated in FIG. 3, the female spool 352 may be inserted into an aperture of the second facesheet 362. The shim 366 may then be placed, assembled, and/or coupled to the second facesheet 362. The shim 366 may cover at least a portion of the female spool 352. The shim 366 may, for example, further hold the female spool 352 in place and/or may be a heat shield for the honeycomb structure and/or the female spool 352. Other examples may include additional shims that may cover the other of the male spool 350 and/or the female spool 352.

Certain examples may include the spacer plate 364. The spacer plate 364 may be the same or a similar thickness to that of the flange portion of the female spool 352. The spacer plate 364 may allow the shim 366 to be laid flush on top of the spacer plate 364. The spacer plate 364 may include a cut-out configured to contain the flange portion of the female spool 352. As such, the shim 366 may rest on the spacer plate 364 and the female spool 352.

The nut 356 may be coupled to the secondary structure 368. The secondary structure 368 may be, for example, a component of the aircraft, the aircraft propulsor 100, and/or the thrust reverser door 124. The secondary structure 368 may be attached to the honeycomb structure. As such, the bolt 354 may include a head and a shank and may be inserted into the through holes of the male spool 350 and the female spool 352 and then through an aperture of the secondary structure 368. The nut 356 may be attached to the bolt 354 at an end (e.g., a threaded end) to clamp or otherwise couple the secondary structure 368 to the honeycomb structure. In certain such examples, clamping force from the bolt 354 may be distributed to the male spool 350 and then evenly distributed from parts of the male spool 350 to the honeycomb structure. In the embodiment shown in FIG. 3, the bolt 354 may be shaped so that, when inserted into the male spool 350, the head of the bolt 354 is flush with a surface of the male spool 350. In certain examples, the bolt 354 and/or the nut 356 may additionally include one or more washers or other apparatuses to more evenly distribute the clamping force. Additionally, load may be transferred from, for example, the secondary structure 368 to the honeycomb structure via the female spool 352.

In certain examples, the secondary structure 368 may be a highly loaded component of an aircraft. As such, the load from the secondary structure 368 may be transferred into the honeycomb structure via the fastening system. The shim 366 and/or the spacer plate 364 may aid in the transfer of load from the secondary structure 368 by closing gaps between the secondary structure 368 and the honeycomb structure and thus allow for a load-path from the secondary structure 368 to the honeycomb structure. Additionally, the shim 366 and/or the spacer plate 364 reduce preload within the fastening system. In certain examples, the shim 366 may also allow for accurate positioning of the secondary structure 368 relative to the fastening system and/or another component of the aircraft or aircraft propulsor by, for example, allowing for distances between such components to be changed via the stacking or taking away of shims.

Figure 4:
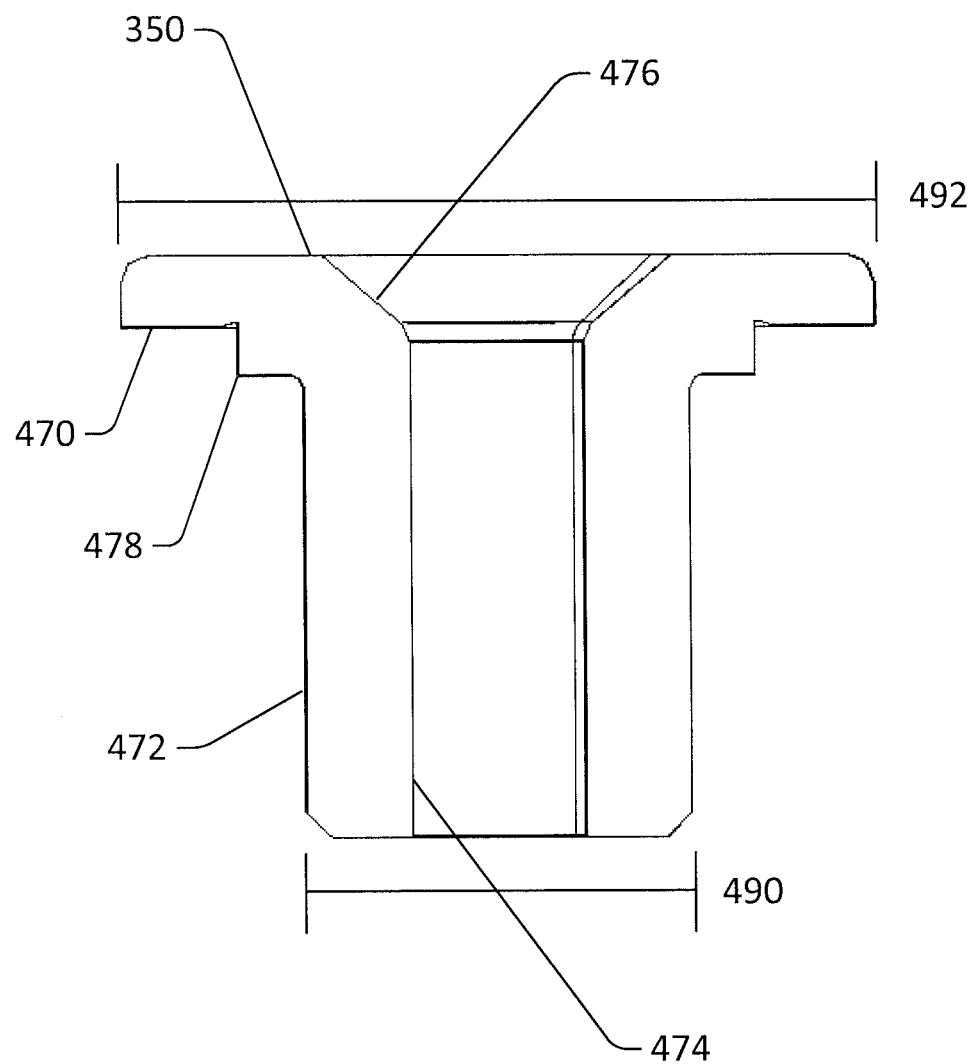
FIG. 4 illustrates a side cutaway view of a male spool in accordance with the disclosure.

FIG. 4 illustrates a side cutaway view of a male spool in accordance with the disclosure. The male spool 350 may include a male spool body. The male spool body may include a male flange portion 470, a male shank portion 472, a male through hole 474, a chamfer 476, and a male shoulder 478.

The male shank portion 472 may be located on a first end of the male spool body. The male shank portion 472 may be inserted into an aperture within a honeycomb structure. The male shank portion 472 may be threaded to, for example, screw onto a threaded portion of the female spool 352.

The male flange portion 470 may located on a second end of the male spool body and may be configured to couple to a facesheet (e.g., the first facesheet 360) of a honeycomb structure. The male flange portion 470 may evenly distribute force from the male spool 350 to the honeycomb structure. The male flange portion 470 may, for example, be sized responsive to an expected force distributed to the male spool 350 such that the expected force is transferred to a sufficiently large area of the honeycomb structure so as to prevent significant and/or plastic deformation of the honeycomb structure and/or the honeycomb core 358. For example, where the male flange portion 470 and the male shank portion 472 are substantially circular in cross section, male flange diameter 492 may be expressed as a ratio of the male shank diameter 490. In certain embodiments, the ratio may be less than 2 to 1, less than 3 to 1, less than 5 to 1, less than 10 to 1, less than 20 to 1, or 20 to 1 or more. In examples where the male flange portion 470 and/or the male shank portion 472 are not substantially circular in cross section, the ratio may be expressed as a ratio of the cross sectional area between the male flange portion 470 and the male shank portion 472.

In certain examples, the male flange portion 470 may be configured to transfer out-of-plane loads (e.g., clamping loads and/or tension loads transferred through the bolt, nut, and/or other structures such as the secondary structure 368). The male flange portion 470 may receive such loads and transfer the loads to the honeycomb structure (e.g., the first facesheet 360).

The through hole 474 may be disposed within the male spool body. The through hole 474 may allow a portion of the bolt 354 to pass through the male spool 350. The through hole 474 may extend from the first end of the male spool body to the second end. In certain examples, the through hole 474 may be substantially smooth so that the bolt 354 may pass through the through hole 474 without threading into the through hole 474. In examples where the male spool 350 is configured to receive a bolt with a head configured to be flush with the male spool 350, the male spool 350 may additionally include the chamfer 350 on one or both ends of the through hole 474. The chamfer 350 may allow for the head of the bolt 354 to be flush when inserted into the male spool 350.

Certain examples of the male spool 350 may include the male shoulder 478. The male shoulder 478 may, for example, be sized to aid in locating the male spool 350 within an aperture of the honeycomb structure. Certain examples of the male shoulder 478 may include chamfers, rounds, and/or other features to aid in the insertion of the male spool 350 into the aperture.

In certain examples, the male shoulder 478 may transfer in-plane loads (e.g., bearing loads) received by the male spool 350 to a honeycomb structure coupled to the male spool 350. Transferring such loads through the male shoulder 478 may decrease and/or eliminate bending of the male spool 350 and/or any bolt or nut attached to the male spool 350. In certain examples, the height of the male shoulder 478 (i.e., its dimension in the y-axis as shown in FIG. 4) may be equal to or greater than the thickness of the facesheet that the male spool 350 is configured to couple to. In certain such examples, certain sides of the male shoulder 478 may be parallel to certain sides of the aperture of the facesheet that the male spool 350 is configured to couple to. Additionally, the diameter of the male shoulder 478 may be sized according to the expected load to transfer force over a sufficiently large bearing area such that no deformation or plastic deformation of the facesheet and/or any other portion of the honeycomb structure results from the transfer of such force. In certain examples, the diameter of the male shoulder 478 may be expressed as a ratio to the diameter of the male shank portion 472. In certain examples, the ratio may be less than 1.1 to 1, less than 1.5 to 1, less than 2 to 1, less than 3 to 1, less than 5 to 1, or 5 to 1 or more.

Figure 5:
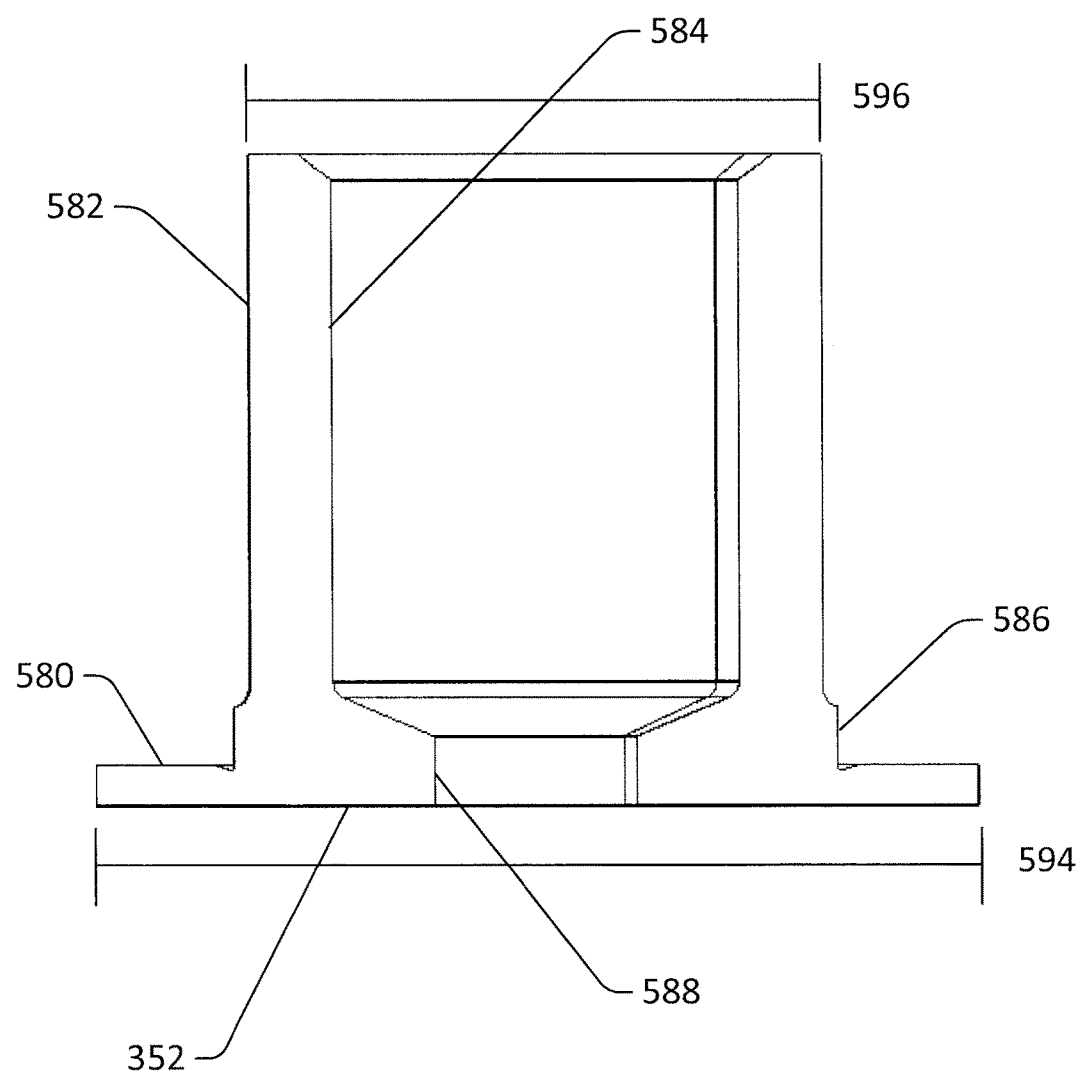
FIG. 5 illustrates a side cutaway view of a female spool in accordance with examples of the disclosure.

FIG. 5 illustrates a side cutaway view of a female spool in accordance with examples of the disclosure. The female spool 352 may include a female spool body. The female spool body may include a female flange portion 580, a female shank portion 582, a female through hole 584, and a female shoulder 586.

The female shank portion 582 may be located on a first end of the female spool body. The female shank portion 582 may be threaded and may be configured to be inserted into an aperture within a honeycomb structure and threaded onto a threaded portion of the male spool 350. As such, the threaded portion of the female shank portion 582 may be threaded to match the threaded portion of the male shank portion 472. Threading together the male spool 350 and the female spool 352 may allow for the male spool 350 and the female spool 352 to be coupled together and mechanically fastened to the honeycomb structure. In certain examples, the male spool 350 and the female spool 352 may be mechanically fastened to the honeycomb structure without the use of adhesives such as potting compounds and/or without the use of welding or other secondary assembly steps.

The female flange portion 580 may located on a second end of the female spool body and may be configured to couple to a facesheet (e.g., the second facesheet 362) of a honeycomb structure. The female flange portion 580 may evenly distribute force from the female spool 352 to the honeycomb structure. Additionally, the female flange portion 580 may, for example, be sized responsive to an expected force distributed to the female spool 352 such that the expected force is transferred to a sufficiently large area of the honeycomb structure so as to prevent significant and/or plastic deformation of the honeycomb structure and/or the honeycomb core 358. For example, where the female flange portion 580 and the female shank portion 582 include substantially circular cross sections, female flange diameter 594 may be expressed as a ratio of the female shank diameter 596. In certain such embodiments, the ratio may be less than 2 to 1, less than 3 to 1, less than 5 to 1, less than 10 to 1, less than 20 to 1, or 20 to 1 or more. Additionally, in examples where the female flange portion 580 and/or the female shank portion 582 do not include substantially circular cross sections, the ratio may be expressed as a ratio of the cross sectional area between the female flange portion 580 and the female shank portion 582.

The through hole 584 may be disposed within the female spool body similar to the through hole 474 of the male spool body. The through hole 584 may allow a portion of the bolt 354 to pass through the female spool 352. The through hole 584 may extend from the first end of the female spool body to the second end. In certain examples, the through hole 584 may be substantially smooth so that the bolt 354 may pass through the through hole 584 without threading into the through hole 584.

Additionally, the through hole 584 may include a through hole shoulder 588. The through hole shoulder 588 may be configured to transfer loads such as bearing loads experienced by the bolt to the honeycomb structure via the female spool 352. In certain examples, the through hole shoulder 588 may include an inner diameter similar to the diameter of the shank of the bolt that the through hole 584 is configured to receive. As such, the bolt may, when loaded, moved, or deflected, contact the through hole shoulder 588 and transfer load to the through hole shoulder 588. Thus, load may be transferred from the bolt to the through hole shoulder 588 and to the honeycomb structure. Such load transfer may prevent significant bending of the bolt under bolt. In certain examples, the through hole 474 of the male spool 350 may alternatively or additionally include a through hole shoulder. In other examples, the through hole 474 of the male spool 350 may be sized to act as a shoulder to transfer load from and prevent deformation or substantial deformation of the bolt.

The female spool 352 may also include, in certain examples, the female shoulder 586. The female shoulder 586 may, for example, be sized to aid in locating the female spool 352 within an aperture of the honeycomb structure. Certain examples of the female shoulder 586 may include features similar to that of the male shoulder 478, including chamfers, rounds, and/or other features to aid in the insertion of the female spool 352 into the aperture. Additionally, the female shoulder 586 may transfer in-plane loads (e.g., bearing loads) received by the female spool to a honeycomb structure coupled to the female spool. Transferring such loads may decrease and/or eliminate bending of the female spool and/or any bolt or nut attached to the female spool.

In certain examples, the height of the female shoulder 586 may be equal to or greater than the thickness of the facesheet that the female spool 352 is configured to couple to. Additionally, in certain such examples, certain sides of the female shoulder 586 may be parallel to certain sides of the aperture of the facesheet. Also, the diameter of the female shoulder 586 and/or the through hole shoulder 588 may be sized according to the expected load to transfer force over a sufficiently large bearing area such that no deformation or plastic deformation of the facesheet results from the transfer of such force. In certain examples, the diameter of the female shoulder 586 may be expressed as a ratio to the diameter of the female shank portion 582. In certain examples, the ratio may be less than 1.1 to 1, less than 1.5 to 1, less than 2 to 1, less than 3 to 1, less than 5 to 1, or 5 to 1 or more.

Figure 6:
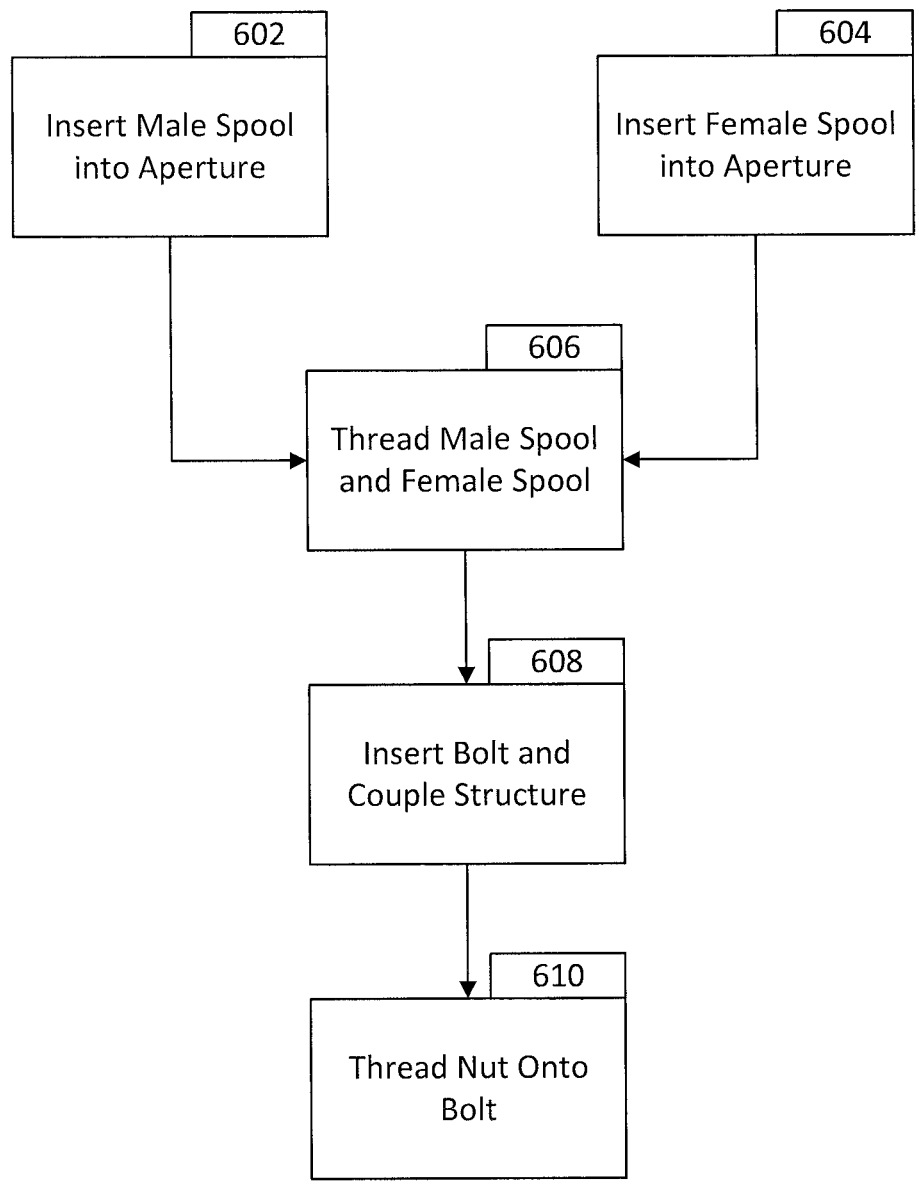
FIG. 6 is a flowchart detailing assembly of a secondary structure to a honeycomb structure in accordance with an example of the disclosure.

FIG. 6 is a flowchart detailing assembly of a secondary structure to a honeycomb structure in accordance with an example of the disclosure. In block 602, a male spool may be inserted into an aperture of the honeycomb structure. In block 604, a female spool may be inserted into the aperture of the honeycomb structure.

In block 606, the male spool and the female spool may be coupled together by threading together thread portions of the male spool and the female spool. In certain embodiments, the male spool and the female spool may be threaded together to a specified torque to couple to and distribute load to the honeycomb structure. In certain examples, the male spool and the female spool may be coupled together without adhesives, welding, or other techniques that may be more labor intensive and/or may lead to failure at high temperatures.

In block 608, after the male spool and the female spool have been inserted into the aperture and coupled together, a bolt may be inserted into a through hole of the male spool and/or the female spool. The bolt may be inserted without threading into the through holes of the male spool and/or the female spool. The bolt may include a head and a shank. The head may contact one end of the through hole(s). A structure of the aircraft (e.g., a structure associated with a thrust reverser) may be coupled to another end of the through hole(s). The bolt may pass through the through hole(s) to be inserted within an aperture of the structure.

In block 610, a nut may be threaded onto the bolt. The nut may hold the structure in place when the threaded onto the bolt. As such, the structure may be disposed between the honeycomb structure and the nut. In certain examples, the nut may be threaded to a specific torque value to securely couple the structure to the honeycomb structure. In certain examples, the specific torque value may crush the honeycomb core 358 of the composite honeycomb structure, even with washers transferring load. In such examples, the fastening system may provide a stiff column to transfer load from the torque and, thus, avoid crushing and/or plastic deformation of the honeycomb structure.

Examples described above illustrate but do not limit the invention. It should also be understood that numerous modifications and variations are possible in accordance with the principles of the present invention. Accordingly, the scope of the invention is defined only by the following claims.

What is claimed is:
1. An aircraft propulsor comprising:
a core engine; and
a thrust reverser comprising an inner wall located proximate the core engine, the inner wall comprising:
a honeycomb structure comprising a first facesheet, a second facesheet, a honeycomb core disposed between the first facesheet and the second facesheet, and an aperture, and
a fastening system disposed within the aperture, the fastening system comprising:

a male spool comprising:
a male through hole,
a male shank portion comprising an external threaded portion disposed on at least a first end of the male spool,
a male flange portion disposed on a second end of the male spool, coupled to the first facesheet, and configured to distribute load to the honeycomb structure, and
a male shoulder portion disposed between the male shank portion and the male flange portion and contacting a side of the first facesheet to transfer a first bearing load to the first facesheet; and
a female spool comprising:
a female through hole,
a female shank portion comprising an internal threaded portion disposed within the female through hole and on at least a first end of the female spool, wherein the female shank portion is coupled to the external threaded portion to fasten the male spool and the female spool to the honeycomb structure,
a female flange portion disposed on a second end of the female spool, coupled to the second facesheet, and configured to distribute load to the honeycomb structure, and
a female shoulder portion disposed between the female shank portion and the female flange portion and contacting a side of the second facesheet to transfer a second bearing load to the second facesheet.

2. The aircraft propulsor of claim 1, wherein the male spool and the female spool are mechanically fastened to the honeycomb structure without adhesives.

3. The aircraft propulsor of claim 1, the fastening system further comprising:
a bolt comprising a head and a shank and disposed through the male through hole and the female through hole; and
a nut fastened to the shank of the bolt, wherein at least one of the male flange portion and the female flange portion is configured to distribute load received from at least one of the bolt and the nut to the honeycomb structure, wherein at least one of the bolt and the nut is coupled to a portion of the aircraft propulsor.

4. The aircraft propulsor of claim 3, wherein the bolt is not threaded into the male spool and the female spool.

5. The aircraft propulsor of claim 1, wherein:
at least one of the male spool and the female spool is configured to transfer a first force amount to the honeycomb structure; and
at least one of the male flange portion and the female flange portion is coupled to the honeycomb structure over a first area, wherein the first area is sized to transfer the first force amount such that the honeycomb core is not plastically deformed.

6. An aircraft comprising the aircraft propulsor of claim 1, wherein the aircraft comprises:
a fuselage;
a wing coupled to the fuselage; and
the aircraft propulsor coupled to at least one of the wing and the fuselage.

7. A fastening system for an aircraft structure, the fastening system comprising:
a male spool comprising:
a male through hole,
a male shank portion comprising an external threaded portion disposed on at least a first end of the male spool,
a male flange portion disposed on a second end of the male spool and configured to couple to a first facesheet of a honeycomb structure and distribute load to the honeycomb structure when the male flange portion is coupled to the first facesheet, and
a male shoulder portion disposed between the male shank portion and the male flange portion and configured to contact a side of the first facesheet to transfer a first bearing load to the first facesheet; and
a female spool comprising:
a female through hole,
a female shank portion comprising an internal threaded portion disposed within the female through hole and on at least a first end of the female spool, wherein the female shank portion is configured to couple to the external threaded portion to fasten the male spool and the female spool to the honeycomb structure,
a female flange portion disposed on a second end of the female spool and configured to couple to a second facesheet of the honeycomb structure and distribute load to the honeycomb structure when the female flange portion is coupled to the second facesheet, and
a female shoulder portion disposed between the female shank portion and the female flange portion and configured to contact a side of the second facesheet to transfer a second bearing load to the second facesheet.

8. The fastening system of claim 7, wherein the male flange portion is wider than the male shoulder portion and the male shoulder portion is wider than the male shank portion, wherein the female flange portion is wider than the female shoulder portion, and wherein the male through hole comprises a first male through hole end, a second male through hole end, and a chamfer at the first male through hole end.

9. The fastening system of claim 7, wherein the male spool and the female spool are configured to be mechanically fastened to the honeycomb structure.

10. The fastening system of claim 9, wherein the male spool and the female spool are configured to be mechanically fastened to the honeycomb structure without adhesives.

11. The fastening system of claim 9, the fastening system further comprising:
a bolt comprising a head and a shank and disposed through the male through hole and the female through hole; and
a nut fastened to the shank of the bolt.

12. The fastening system of claim 11, wherein the bolt is not threaded into the male spool and the female spool.

13. The fastening system of claim 11, wherein at least one of the male flange portion and the female flange portion is configured to distribute a clamp load received from at least one of the bolt and the nut to the honeycomb structure.

14. The fastening system of claim 9, further comprising the honeycomb structure, wherein the honeycomb structure comprises the first facesheet, the second facesheet, and a honeycomb core disposed between the first facesheet and the second facesheet.

15. The fastening system of claim 11, wherein at least one of the bolt and the nut is configured to couple to a secondary structure of an aircraft comprising the aircraft structure.

16. The fastening system of claim 7, wherein:
at least one of the male spool and the female spool is configured to transfer a first force amount to the honeycomb structure; and
at least one of the male flange portion and the female flange portion is configured to couple to the honeycomb structure over a first area, wherein the first area is sized to transfer the first force amount such that a honeycomb core of the honeymoon honeycomb structure is not plastically deformed.

17. The fastening system of claim 7, wherein at least one of the male spool and the female spool comprises a coefficient of thermal expansion substantially similar to the coefficient of thermal expansion of the honeycomb structure and wherein the honeycomb structure comprises a first material, at least one of the male spool or the female spool comprises the first material, and first material comprises a metallic material or a composite material.

18. The fastening system of claim 7, wherein the female spool further comprises a through hole shoulder disposed within the female through hole.

19. An aircraft comprising the fastening system of claim 7, wherein the aircraft comprises:
a fuselage;
a wing coupled to the fuselage; and
an aircraft propulsor coupled to at least one of the wing and the fuselage and comprising a core engine and a thrust reverser, wherein the thrust reverser comprises an inner wall located proximate the core engine, the inner wall comprising:
a honeycomb structure comprising a first facesheet, a second facesheet, a honeycomb core disposed between the first facesheet and the second facesheet, and an aperture, and
the fastening system disposed within the aperture, wherein the male flange portion is coupled to the first facesheet and the female flange portion is coupled to the second facesheet, and the internal threaded portion is coupled to the external threaded portion to fasten the male spool and the female spool to the honeycomb structure.

20. A method of assembling the fastening system of claim 7, the method comprising:
coupling the male spool to the first facesheet of the honeycomb structure;
coupling the internal threaded portion and the external threaded portion;
fastening the male spool and the female spool to the honeycomb structure; and
coupling the female spool to the second facesheet of the honeycomb structure.

* * * * *

UNITED STATES PATENT AND TRADEMARK OFFICE
CERTIFICATE OF CORRECTION

PATENT NO. : 10,309,434 B2
APPLICATION NO. : 15/087531
DATED : June 4, 2019
INVENTOR(S) : Fedor Kleshchev et al.

It is certified that error appears in the above-identified patent and that said Letters Patent is hereby corrected as shown below:

In the Claims

In Column 13, Line 12, Claim 16 change "core of the honeymoon honeycomb" to --core of the honeycomb--

Signed and Sealed this
Third Day of September, 2019

Andrei Iancu
*Director of the United States Patent and Trademark Office*